US007181727B1

(12) United States Patent
Bachmat et al.

(10) Patent No.: US 7,181,727 B1
(45) Date of Patent: Feb. 20, 2007

(54) PROVIDING DATA INDICATIVE OF THE PERFORMANCE OF A COMPETING ALGORITHM AND AN INCUMBENT ALGORITHM

(75) Inventors: Eitan Bachmat, Lehavim (IL); Hagit Bachmat, Lehavim (IL); Ron Arnan, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 718 days.

(21) Appl. No.: 10/083,670

(22) Filed: Feb. 26, 2002

(51) Int. Cl.
*G06F 9/44* (2006.01)
*G06F 9/45* (2006.01)

(52) U.S. Cl. ......................... 717/124; 717/135; 703/22

(58) Field of Classification Search ................ 717/135, 717/125, 124, 101, 120–121, 127; 703/13, 703/22; 714/37–38; 700/90–92, 108; 709/226
See application file for complete search history.

(56) References Cited

U.S. PATENT DOCUMENTS 5,809,282 A * 9/1998 Cooper et al. .............. 709/226
2003/0093250 A1* 5/2003 Goebel .......................... 703/2

* cited by examiner

*Primary Examiner*—Antony Nguyen-Ba

(74) *Attorney, Agent, or Firm*—Fish & Richardson P.C.

(57) ABSTRACT

A method for providing data indicative of the performance of a competing algorithm and an incumbent algorithm includes evaluating an incumbent-algorithm score indicative of a performance of an incumbent algorithm. The performance of a competing algorithm executing in place of the incumbent algorithm is then simulated. On the basis of the simulation, a competing-algorithm score predictive of a performance of the competing algorithm is evaluated. These scores are then provided to an output device.

29 Claims, 1 Drawing Sheet

PROVIDING DATA INDICATIVE OF THE PERFORMANCE OF A COMPETING ALGORITHM AND AN INCUMBENT ALGORITHM

FIELD OF INVENTION

This invention relates to data-storage systems, and in particular, to monitoring the performance of algorithms executed by such systems.

BACKGROUND

The success of a data-storage system depends, to a great extent, on its ability to reliably read and write large amounts of data very quickly. To do so, the data-storage system is often called upon to perform several tasks, each of which can be performed using any one of several different algorithms.

Configuring a data-storage system typically includes selecting, for each task that the data-storage system is called upon to perform, a particular algorithm for performing that task. In some cases, the algorithm is selected, in part, on the basis of the manner in which the data-storage system is expected to be used. In other cases, the algorithm is simply a default algorithm.

Once the data-storage system has been configured, it becomes difficult to confirm that the algorithm selected for a particular task is truly the best choice for that task. Although it is possible to determine how well the chosen algorithm has performed over a specified interval, this is not enough. It is always possible that another algorithm, had it been executing during that same interval, would have done better.

One approach to comparing the performance of two algorithms is to allow the first algorithm to operate during a first interval and then to allow the second algorithm to operate during a second interval. There are several flaws in this approach. First, the usage patterns of the data-storage system, upon which the performance depends, may differ during the first and second intervals. Second, this approach rapidly becomes more time-consuming as more algorithms are compared. Third, it is inconvenient to have to reconfigure the data-storage system simply to test other algorithms.

Because of the difficulty associated with comparing the performances of different algorithms, many data storage systems are needlessly crippled by algorithms that are inappropriate for their usage patterns.

SUMMARY

The invention is based on the recognition that a data-storage system can statistically characterize the manner in which it is used. The data-storage system can then use the resulting characterization to simulate the performance of algorithms that are not actually being executed on the data-storage system. The simulated performances of these algorithms can then be directly compared with the performance of an incumbent algorithm that is actually being executed. This results in a data-storage system that can dynamically demonstrate how different algorithms would have performed had they been operating on the same input data stream as that being operated upon by the incumbent algorithm.

The invention achieves the foregoing result by simulating the execution of competing algorithms for the same task and continuously monitoring the performance of each competing algorithm. The performance of one or more of the competing algorithms is then compared with a corresponding performance of whichever algorithm is the incumbent algorithm.

In some practices of the invention, a method for providing data indicative of the performance of a competing algorithm and an incumbent algorithm includes evaluating an incumbent-algorithm score indicative of a performance of an incumbent algorithm. The performance of a competing algorithm executing in place of the incumbent algorithm is then simulated. On the basis of the simulation, a competing-algorithm score predictive of a performance of the competing algorithm is evaluated. The competing-algorithm score and the incumbent-algorithm score are then made available, typically to an output device.

In other practices of the invention, providing data includes monitoring the incumbent-algorithm score and the competing-algorithm score during a selected interval. Examples of such data include a ratio indicative of an extent to which the competing-algorithm score exceeds the incumbent algorithm score during the selected interval.

In other practices of the invention, simulating performance includes obtaining meta-data characterizing an input-data stream being provided to the incumbent algorithm. Such meta-data can include, but is not limited to, statistics descriptive of the input data-stream during the selected interval. The performance of the competing algorithm is then simulated using this meta-data. The result of this simulation is predictive of the performance of the competing algorithm were it to operate on the input-data stream characterized by the meta-data.

Other practices of the invention include providing data indicative of a performance of a competing algorithm and an incumbent algorithm in a data-storage system. Methods for doing so include the statistical characterization of a usage pattern of the data-storage system; and on the basis of the statistical characterization, the simulation of a performance of the competing algorithm were it to execute on the data-storage system in place of the incumbent algorithm. In certain embodiments, statistical characterization of a usage pattern of the data-storage system includes generating meta-data that characterizes an input data-stream to the data-storage system.

Additional practices of the invention include evaluating actual performance of the incumbent algorithm in response to the usage pattern and simulating performance of the competing algorithm in response to the usage pattern. The resulting data, which is indicative of a comparison between the actual performance of the incumbent algorithm and the simulated performance of the competing algorithm, is then provided to an output device.

Another practice of the invention includes comparing how well each of a plurality of algorithms performs a task. This practice includes simulating execution of a competing algorithm operating on the input stream; evaluating, on the basis of the simulation, a competing-algorithm performance of that competing algorithm; and evaluating the actual performance of an incumbent-algorithm operating on the input stream. The resulting data, which is indicative of a comparison between the incumbent algorithm's actual performance and the competing algorithm's simulated performance, is then made available.

The invention also includes systems for carrying out the foregoing methods. One such system includes a data-condenser configured to receive a data-stream and to generate meta-data characterizing the data stream. The data-condenser communicates with a competing-algorithm simulator that generates data indicative of a performance attribute of a competing algorithm when the competing algorithm operates on a data-stream characterized by the meta-data. A tournament manager receives the performance attributes and makes available output data indicative of a comparison between a performance attribute of the competing algorithm and a corresponding performance attribute of an incumbent algorithm.

These and other features of the invention will be apparent from the following detailed description and the figures, in which:

DETAILED DESCRIPTION

Figure 1:
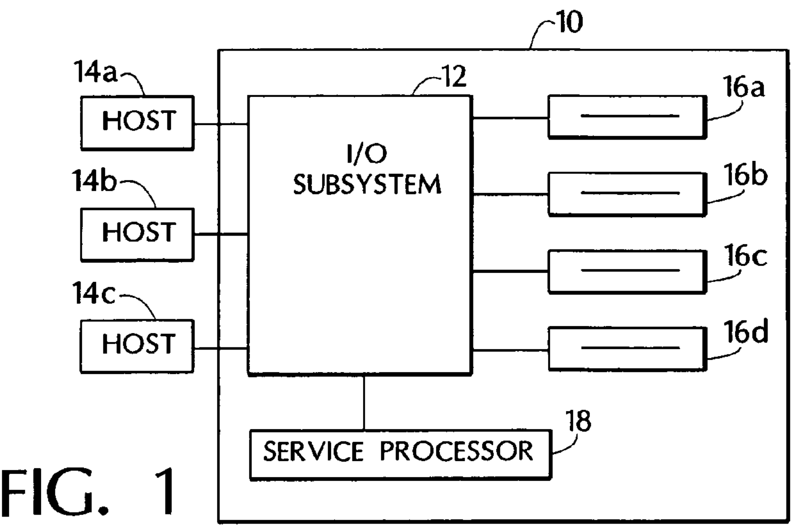
FIG. 1 shows a data-storage system.

Referring to FIG. 1, a data-storage system 10 includes an I/O subsystem 12 that provides an interface between one or more hosts 14*a–c* and one or more mass-storage elements 16*a–d*. The hosts 14*a–c* request the I/O subsystem 12 to perform particular tasks. In a data-storage system 10, these tasks are most typically requests to store data and requests to retrieve data. The mass-storage elements 16*a–d* are most often disk drives. However, the principles of the invention described herein are independent of the particular media used to store data.

A service processor 18 in communication with the I/O subsystem 12 controls the operation of the I/O subsystem 12. The service processor 18 can be accessed either at the site of the data-storage system 10 or remotely, through a data communication link.

A variety of algorithms exist for performing the tasks requested by the hosts 14*a–c*. Using the service processor 18, a system operator can control which of these algorithms is used to perform a given task. However, the best algorithm for performing a task depends on the usage patterns of the data-storage system 10. These usage patterns can change with time.

For example, in one algorithm for retrieving data, the I/O subsystem 12, in response to a host's request for data, pre-fetches additional, related data. To the extent that a request for particular data is followed shortly thereafter by a request for the related data, this strategy reduces latency. However, if there is no correlation between a request for particular data and subsequent requests for related data, this strategy consumes system resources unnecessarily, thereby increasing latency.

Another source of latency arises because the hosts 14*a–c* might issue requests faster than the I/O subsystem 12 can process those requests. The I/O subsystem 12 manages these competing demands by maintaining queues and distributing requests among those queues. There are several well-known algorithms available for managing queues, each of which has its own set of advantages and disadvantages. As just one example, the I/O subsystem 12 may choose to process brief tasks before processing more time-consuming tasks. The advantage of this algorithm is that users requesting simple operations will, consistent with their expectations, experience lower latencies. The disadvantage of this algorithm is that if there are too many brief tasks, time-consuming tasks may be excessively delayed.

In both of the foregoing examples, the best algorithm for accomplishing a task depends on the manner in which the I/O subsystem 12 is being used at around the time the I/O subsystem 12 receives a request to perform that task. In many cases, this is unpredictable.

The selection of the best algorithm for performing a task is thus an empirical process in which the performances of candidate algorithms are compared with each other as those algorithms operate on a live input stream. This might be achieved by executing a first algorithm for a first interval followed by executing a second algorithm for a second interval. The flaw in this approach, however, is that the live input stream is a non-stationary random process. As a result, statistics characterizing a live input stream during that first interval may not be the same as those characterizing the live input stream during the second interval.

Figure 2:
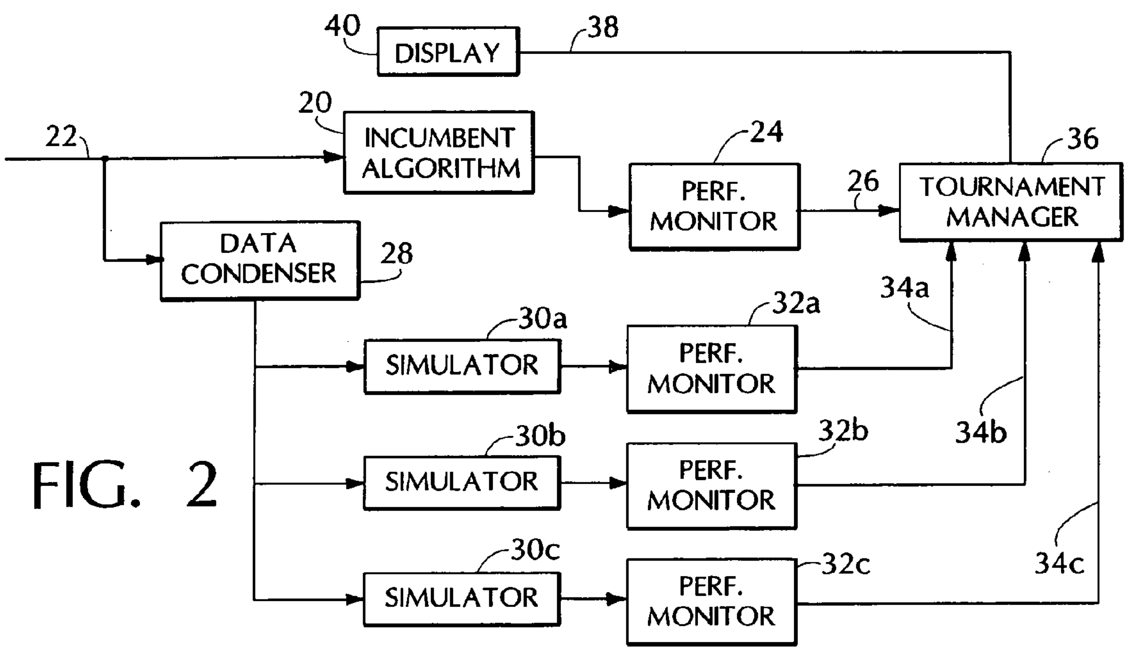
FIG. 2 shows an architecture embodying the invention.

FIG. 2 shows an architecture for enabling a system operator to more readily compare the performances of different algorithms performing the same task on what is effectively the same input stream. The constituents of the architecture shown in FIG. 2 represent processes being executed by one or more processors. These processes can be executed by one or more processors in the I/O subsystem 12, by the service processor 18 in communication with the I/O subsystem 12, or by a combination of one or more processors in the I/O subsystem 12 and the service processor 18.

The architecture shown in FIG. 2 simulates the performance of one or more competing algorithms on the same live data stream. In the illustrated system, an incumbent-algorithm process 20 receives data in an input data-stream 22 and processes that data in the conventional manner. At one time, the incumbent algorithm may have been the best algorithm for performing a particular task. However, this is no guarantee that the incumbent algorithm will forever be the best algorithm. As the nature of the input data-stream 22 changes over time, the best algorithm for processing that input data-stream 22 might also change.

Although FIG. 2 shows an input data-stream 22 entering the incumbent-algorithm process 20, this need not be the case. The input data-stream 22 can be any data-stream that can be used to compare the performance of an incumbent algorithm with the performance of one or more competing algorithms.

An incumbent-algorithm performance-monitor 24 in communication with the incumbent-algorithm process 20 continuously monitors the performance of the incumbent algorithm. The performance attribute measured by the incumbent-algorithm performance-monitor 24 depends, in part, on the nature of the task being performed by the incumbent algorithm. Generally, the performance attribute measures, directly or indirectly, the latency that results from application of the incumbent algorithm to the input data-stream 22.

The choice of a performance attribute depends in part on the task to be performed. For example, if the task is to manage a cache memory, a suitable performance attribute might be a hit ratio that indicates the probability that data sought is already in the cache memory. Other performance attributes might include response time, bandwidth, and throughput. Whichever performance attribute is selected, the output of the incumbent-algorithm performance-monitor 24 is an incumbent-algorithm score 26 indicative of the performance of the incumbent algorithm.

The input data-stream 22 provided to the incumbent-algorithm process 20 is also provided to a data-condenser 28. The data-condenser 28 extracts meta-data from the input data-stream 22 and passes that meta-data to one or more competing-algorithm simulators 30*a–c*. Meta-data refers to data that characterizes the input data-stream 22. For example, meta-data might refer to the number of requests for data stored within a particular range of locations. In effect, meta-data is data that is used to statistically characterize the input data-stream 22. The particular type of meta-data extracted by the data-condenser 28 depends on the nature of the task being performed.

Each of the competing-algorithm simulators 30*a–c* simulates the application of a corresponding competing algorithm for performing the same task that is being performed by the incumbent algorithm process 20. The results of the simulations are then provided to one or more competing-algorithm performance-monitors 32*a–c*. These competing-algorithm performance-monitors 32*a–c* measure the same performance attribute measured by the incumbent-algorithm performance-monitor 24. Each competing-algorithm performance-monitor 32*a–c* generates competing-algorithm scores 34*a–c* indicative of their respective algorithms' performances.

The competing-algorithm scores 34*a–c* and the incumbent-algorithm score 26 are all provided to a tournament manager 36. The tournament manager 36 monitors these scores over time and periodically provides output data 38 to an output device 40. This output data 38 includes data indicative of a comparison between the performance of the incumbent algorithm and the performances of one or more of the competing algorithms. A system operator viewing this output data 38 on the output device 40 is then in a better position to determine whether to replace the incumbent algorithm by one of the competing algorithms.

The nature of the output data 38 that the tournament manager 36 provides to the output device 40 is programmable. The output data can include data indicative of an extent to which the competing-algorithm score 32*a–c* exceeds the incumbent-algorithm score 26 and how consistently the competing-algorithm score 32*a–c* exceeds the incumbent-algorithm score 26. In one practice of the invention, the tournament manager 36 can handicap the competing-algorithm scores 32*a–c* by amounts that reflect the system resources consumed in replacing the incumbent algorithm with the competing algorithm.

A system as illustrated in FIG. 2 thus enables a data-storage system 10 to demonstrate the relative performances of competing algorithms operating in parallel on statistically identical input streams. It does so by continuously estimating, for each competing algorithm, what the performance of that competing algorithm would have been had that competing algorithm instead been the incumbent algorithm. The system then provides output data indicative of whether the competing algorithm would have been better than the incumbent algorithm over a statistically significant interval. This output data enables a system operator to assess the desirability of replacing the incumbent algorithm with a competing algorithm.

Having described the invention, and a preferred embodiment thereof, what we claim as new and secured by Letters Patent is:

1. In a data-storage system, a method for providing data indicative of the performance of a competing algorithm and an incumbent algorithm, said method comprising:

evaluating an incumbent-algorithm score indicative of a performance of an incumbent algorithm;

simulating performance of a competing algorithm executing in place of said incumbent algorithm;

on the basis of said simulation, evaluating a competing-algorithm score predictive of a corresponding performance of said competing algorithm; and providing said competing-algorithm score and said incumbent-algorithm score to an output device.

2. The method of claim 1, further comprising providing data indicative of a performance difference between said competing algorithm and said incumbent algorithm.

3. The method of claim 2, wherein providing data comprises monitoring said incumbent-algorithm score and said competing-algorithm score during a selected interval.

4. The method of claim 3, wherein providing data further comprises displaying data indicative of a performance of said incumbent algorithm and said competing algorithm during said selected interval.

5. The method of claim 4, wherein displaying data comprises evaluating a ratio indicative of an extent to which said competing-algorithm score exceeds said incumbent algorithm score during said selected interval.

6. The method of claim 1, wherein simulating performance comprises:

obtaining meta-data characterizing an input-data stream provided to said incumbent algorithm; and simulating performance of said competing algorithm were it to operate on an input-data stream characterized by said meta-data.

7. The method of claim 6 wherein obtaining meta-data comprises maintaining statistics descriptive of said input data-stream during a selected interval.

8. The method of claim 1, wherein evaluating a competing-algorithm score comprises incorporating a penalty into said competing-algorithm score.

9. The method of claim 8, further comprising selecting said penalty to be indicative of a cost associated with replacing said incumbent algorithm with said competing algorithm.

10. A method for providing data indicative of a performance of a competing algorithm and an incumbent algorithm in a data-storage system, said method comprising:

statistically characterizing a usage pattern of said data-storage system; and on the basis of said statistical characterization, simulating a performance of said competing algorithm were it to execute on said data-storage system in place of said incumbent algorithm.

11. The method of claim 10, further comprising:

evaluating actual performance of said incumbent algorithm in response to said usage pattern;

simulating said performance of said competing algorithm in response to said usage pattern; and communicating, to an output device, data indicative of a comparison between said actual performance of said incumbent algorithm and said simulated performance of said competing algorithm.

12. The method of claim 11, further comprising incorporating a cost of replacement into a performance selected from the group consisting of:

(1) said actual performance of said incumbent algorithm, and (2) said simulated performance of said competing algorithm.

13. The method of claim 10, wherein statistically characterizing a usage pattern of said data-storage system comprises generating meta-data that characterizes an input data-stream to said data-storage system.

14. A method for comparing performances of a plurality of algorithms in performing a task, said method comprising:

simulating execution of a competing algorithm operating on an input stream;

evaluating, on the basis of said simulation, a competing-algorithm performance of said competing algorithm;

evaluating an incumbent-algorithm performance of an incumbent-algorithm operating on said input stream; and providing data indicative of a comparison between said incumbent-algorithm performance and said competing-algorithm performance.

15. A data-storage system comprising:

a processor;

and computer-readable media having software encoded thereon, said software having instructions for causing the processor to execute:

a data-condenser configured to receive a data-stream, said data-condenser generating meta-data characterizing said data stream;

a competing-algorithm simulator in communication with said data-condenser, said competing algorithm simulator generating data indicative of a performance attribute of a competing algorithm when said competing algorithm operates on a data-stream characterized by said meta-data; and a tournament manager configured to provide output data indicative of a comparison between a performance attribute of said competing algorithm and a corresponding performance attribute of an incumbent algorithm.

16. A computer-readable medium having encoded thereon software for providing data indicative of the performance of a competing algorithm and an incumbent algorithm, said software comprising instructions for:

evaluating an incumbent-algorithm score indicative of a performance of an incumbent algorithm;

simulating performance of a competing algorithm executing in place of said incumbent algorithm;

on the basis of said simulation, evaluating a competing-algorithm score predictive of a corresponding performance of said competing algorithm; and providing said competing-algorithm score and said incumbent-algorithm score to an output device.

17. The computer-readable medium of claim 16, wherein said software further comprises instructions for providing data indicative of a performance difference between said competing algorithm and said incumbent algorithm.

18. The computer-readable medium of claim 17, wherein said instructions for providing data comprise instructions for monitoring said incumbent-algorithm score and said competing-algorithm during over a selected interval.

19. The computer-readable medium of claim 18, wherein said instructions for providing data further comprise instructions for displaying data indicative of a performance of said incumbent algorithm and said competing algorithm during said selected interval.

20. The computer-readable medium of claim 19, wherein said instructions for displaying data comprise instructions for evaluating a ratio indicative of an extent to which said competing-algorithm score exceeds said incumbent algorithm score during said selected interval.

21. The computer-readable medium of claim 16, wherein said instructions for simulating performance comprise instructions for:

obtaining meta-data characterizing an input-data stream provided to said incumbent algorithm; and wherein simulating performance of a competing algorithm comprises simulating performance of said competing algorithm were it to operate on an input-data stream characterized by said meta-data.

22. The computer-readable medium of claim 21 wherein said instructions for obtaining meta-data comprise instructions for maintaining statistics descriptive of said input data-stream during a selected interval.

23. The computer-readable medium of claim 16, wherein said instructions for evaluating a competing-algorithm score comprise instructions for incorporating a penalty into said competing-algorithm score.

24. The computer-readable medium of claim 23, wherein said software further comprises instructions for selecting said penalty to be indicative of a cost associated with replacing said incumbent algorithm with said competing algorithm.

25. A computer-readable medium having encoded thereon software for providing data indicative of a performance of a competing algorithm and an incumbent algorithm in a data-storage system, said software comprising instructions for:

statistically characterizing a usage pattern of said data-storage system; and on the basis of said statistical characterization, simulating a performance of said competing algorithm were it to execute on said data-storage system in place of said incumbent algorithm.

26. The computer-readable medium of claim 25, wherein said software further comprises instructions for:

evaluating actual performance of said incumbent algorithm in response to said usage pattern;

simulating said performance of said competing algorithm in response to said usage pattern; and communicating, to an output device, data indicative of a comparison between said actual performance of said incumbent algorithm and said simulated performance of said competing algorithm.

27. The computer-readable medium of claim 26, wherein said software further comprises instructions for incorporating a cost of replacement into a performance selected from said actual performance of said incumbent algorithm and said simulated performance of said competing algorithm.

28. The computer-readable medium of claim 25, wherein said instructions for statistically characterizing a usage pattern of said data-storage system comprise instructions for generating meta-data that characterizes an input data-stream to said data-storage system.

29. A computer-readable medium having encoded thereon software for comparing performances of a plurality of algorithms in performing a task, said software comprising instructions for:

simulating execution of a competing algorithm operating on an input stream;

evaluating, on the basis of said simulation, a competing-algorithm performance of said competing algorithm;

evaluating an incumbent-algorithm performance of an incumbent-algorithm operating on said input stream; and providing data indicative of a comparison between said incumbent algorithm and said competing algorithm.

* * * * *